United States Patent [19]

Hougham et al.

[11] Patent Number: 5,324,813
[45] Date of Patent: Jun. 28, 1994

[54] LOW DIELECTRIC CONSTANT FLUORINATED POLYMERS AND METHODS OF FABRICATION THEREOF

[75] Inventors: Gareth G. Hougham, Ossining, N.Y.; Jane M. Shaw, Ridgefield, Conn.; Alfred Viehbeck, Stormville, N.Y.

[73] Assignee: International Business Machines Corporation, Armonk, N.Y.

[21] Appl. No.: 918,814

[22] Filed: Jul. 22, 1992

[51] Int. Cl.$^5$ .................. C08G 73/10; C08G 69/26
[52] U.S. Cl. .................. 528/353; 528/26; 528/33; 528/45; 528/125; 528/128; 528/170; 528/171; 528/172; 528/173; 528/174; 528/176; 528/183; 528/188; 528/190; 528/220; 528/229; 528/350; 528/352
[58] Field of Search .................. 528/353, 188, 26, 125, 528/33, 128, 45, 170, 172, 335, 173, 337, 174, 171, 176, 183, 190, 220, 229, 350, 352

[56] References Cited

U.S. PATENT DOCUMENTS

| | | | |
|---|---|---|---|
| 3,542,735 | 11/1970 | Lynch | 528/353 |
| 3,793,291 | 2/1974 | Cohen | 528/353 |
| 4,045,407 | 8/1977 | Keske et al. | 528/331 |
| 4,495,342 | 1/1985 | Landis | 528/125 |
| 4,689,391 | 8/1987 | Peters et al. | 528/179 |
| 4,892,896 | 1/1990 | Wright | 523/300 |
| 4,910,308 | 3/1990 | Teshirogi | 544/336 |
| 4,935,490 | 6/1990 | Hayes | 528/353 |
| 5,013,840 | 5/1991 | Teshirogi | 544/357 |
| 5,021,540 | 6/1991 | Leone-Bay et al. | 528/353 |
| 5,026,822 | 6/1991 | Vora | 528/353 |
| 5,049,649 | 9/1991 | Rohitkumar | 528/353 |
| 5,071,997 | 12/1991 | Harris | 528/353 |
| 5,089,593 | 2/1992 | Fjare | 528/188 |
| 5,112,941 | 5/1992 | Kasai | 528/353 |

FOREIGN PATENT DOCUMENTS 249029  2/1990  Japan.
260933  3/1990  Japan.

Primary Examiner—Kight, III: John
Assistant Examiner—P. Hampton Hightower
Attorney, Agent, or Firm—Daniel P. Morris

[57] ABSTRACT

Low dielectric constant polyimides formed from an optionally fluorinated dianhydride and a fluorinated diamine are described. The fluorine containing constituents are sterically disposed so that the dipole moment of the constituents tend to cancel out. Since fluorine containing diamines are generally nonreactive, to achieve a polyimide of high enough molecular weight to be practically useful, a method of fabrication of a high molecular weight polymer from monomers of low reactivity is provided. The monomers, such as a diamine and dianhydride are provided in a solution within which a low molecular weight polyamic acid is formed. The solution is dried. The polyamic acid used is cured to a low molecular weight polyimide. The polyimide is redisolved, redryed and recured enough times to build up the molecular weight to a useful level. The method is applicable to fabricating other polymers of high molecular weight, such as polyamides, polyesters and polyurethanes.

35 Claims, 7 Drawing Sheets n = NUMBER OF CYCLES

LOW DIELECTRIC CONSTANT FLUORINATED POLYMERS AND METHODS OF FABRICATION THEREOF

FIELD OF THE INVENTION

This invention relates to low dielectric constant polymers and methods of fabrication thereof. More particularly, the polymers are fluorinated. More particularly, the polymers are polyimides, polyamides, polyurethanes and polyesters. More particularly, the polyimide is formed from a dianhydride and a diamine wherein either or both contains fluorine. More particularly, the fluorine constituents are symmetrically disposed with respect to each other. More particularly, the diamine has a plurality of fluorinated constituents which are in non-ortho positions of an aromatic substituent. Most particularly, the polymer contains a phenyl ring and contains fluorine containing constituents, the optimal positioning of which, with respect to each other, is symmetrical relative to the axis of the phenyl ring rotation which precludes ortho positioning of the fluorine containing constituents.

BACKGROUND OF THE INVENTION

Polyimides find extensive use in electronic applications where they are useful in forming dielectric films on electrical and electronic devices such as capacitors, semiconductors and semiconductor packaging structures. Typical uses for polyimides include protective coatings for semiconductors, dielectric layers for multilayer integrated circuits, dielectric layers for multilayer integrated circuit packages, high temperature solder masks, bonding multilayer circuits, final passivating coatings on electronic devices and the like.

It is well known in the polymer art that polyimides can be made by the condensation polymerization of dianhydrides and diamines to form polyamic acid. These polyamic acids are readily dehydrated to the corresponding polyimides by heating at high temperatures, e.g. 300° to 400° C.

Future progress in thin film package and chip performance is largely dependent on the development of new insulating materials that can simultaneously meet a host of challenging property criteria. It is often observed that changes made to the chemical structure of a polymer that improve one property degrades another. Thus simultaneous improvement of all target properties with a given structural change is virtually unknown. One pair of properties which often display such counter trends are the dielectric constant and the glass transition temperature, two of the most important properties for a thin film insulator.

Low dielectric constant is desired for future chips and packages which will have increasingly narrower spacing between adjacent conductors. Low dielectric constant is desired to avoid cross talk and capacitive coupling between these conductors which will carry rapidly switching transient signals. High molecular weight is desirable to form a polymer film having suitable properties for a thin film insulator such as mechanical toughness which enables it to withstand the considerable stresses experienced during manufacturing of electronic components.

Diamines containing fluorine generally have a slow rate of reaction with a dianhydride and therefore will not result in a polymer having high molecular weight when processed. Polyimides are fabricated by combining the dianhydride and diamine in a solvent to intermix the diamine and dianhydride. Typically, with normal polyimides, the condensation polymerization occurs exclusively in the solvent, usually at room temperature. With some fluorinated systems of low reactivity only a limited amount of polymerization occurs in solution and an additional polymerization occurs upon drying and heating to high temperature to form a solid. The nitrogen atoms of the diamine react with the anhydride end groups of the dianhydride to form the polymer by condensation polymerization. If the amine is very reactive with the dianhydride a polymer of high molecular weight is formed. If there is a low rate of reaction between the diamine and dianhydride, an oligomer of low molecular weight is formed. Fluorine containing diamines are relatively nonreactive with dianhydrides and therefore, standard processing forms low molecular weight fluorinated polyimides, especially when the fluorinated constituents are bonded to a position ortho to the nitrogen.

SUMMARY OF THE INVENTION

An object of the present invention is to provide a polymer of low dielectric constant.

Another object of the present invention is to provide a high molecular weight, low dielectric constant polymer.

Yet another object of the present invention is to provide a low dielectric constant polymer having fluorine containing constituents which are symmetrically disposed so that the dipole moments of these constituents tend to cancel out thereby resulting in low dielectric constant polymer.

A further object of the present invention is to provide a high molecular weight polymer and a method of fabrication thereof formed from a constituent having a low rate of chemical reaction.

An additional object of the present invention is to provide a method to fabricate high molecular weight, low dielectric constant polyimides, polyamides, polyurethathanes and polyesters.

A broad aspect of the present invention is a composition of matter having structural formula:

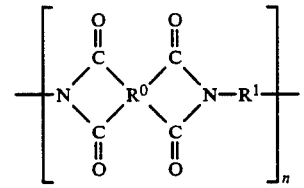

wherein $R^0$ is organic and optionally contains fluorine; wherein $R^1$ is aromatic containing fluorine containing constituents sterically arranged so that the dipole moments of these constituents tend to cancel.

Another broad aspect of the present invention is a method of making a high molecular weight polymer from monomers of low reactivity by providing the monomers in a solvent within which the monomers react by a polycondensation reaction to form an oligomer or polymeric precursor. The solution is dried to remove the solvent. The oligomer or polymeric precursor is heated to a cure temperature to form a low molecular weight polymer. The low molecular weight polymer is redissolved in a solvent, redried and again heated to the cure temperature. The cycles of redissolving, drying and curing is repeated to build up the molecular weight of the oligomer to form a high molecular weight polymer.

In another more particular aspect of the method of the present invention the polymer is a polyimide, a polyurethane, a polyamide, a polyester, or any other polymer type that is typically prepared by an A-B type polycondensation technique.

BRIEF DESCRIPTION OF THE DRAWINGS

These and other objects, features and advantages of the present invention will become apparent upon a consideration of the following detailed description and the invention when read in conjunction with the drawing Figures, in which.

DETAILED DESCRIPTION

For convenience, the following description is primarily directed to the synthesis of polyimides. Those of skill in the art will recognize that the methods described herein are generally applicable to polymers formed by polycondensation from constituents having low chemical reactivity.

The synthesis of polyimides using monomers of low reactivity produces very low molecular weight polymers which renders them of little use in most applications. By combining two known polymerization techniques solution polycondensation and melt polycondensation, the limitations and drawbacks of each are overcome providing access to a range of new polymers. Solution polycondensation is limited by the boiling point of the solvent and the monomer concentrations that can be utilized. Maximum reaction is affected by running the reaction at as high a temperature as the polymer can withstand without degradation and at the highest concentration possible. Both of those controlling factors are optimized by reacting in the solid state whereby the temperatures obtainable are greater than that of a solution and the concentration can be made to be nearly 100% when solvent free during the later steps of a high temperature cure. The limitation of a solid state melt polmerization alone is that for polyimides and many other high performance polymers the true melting points either cannot be achieved at all or only during the first stages of molecular weight growth. A true melting point is required to provide adequate polymer chain mobility for high extents of reaction. Therefore, traditional solution or melt polymerizations are inadequate, but combined according to the teaching of the present invention, high molecular weight materials are achievable.

It may also be worth noting that instead of starting with a solution as the first step, a dry monomer mixture could be heated to high temperatures as the first step followed by redissolving, redrying and recuring.

In order to obtain high molecular weight polyimides or other polymers, such as when using monomers of low reactivity, a solution polycondensation reaction followed by one or a series of solid state chain extension reactions can provide a simple route to high molecular weight materials.

Figure 1:
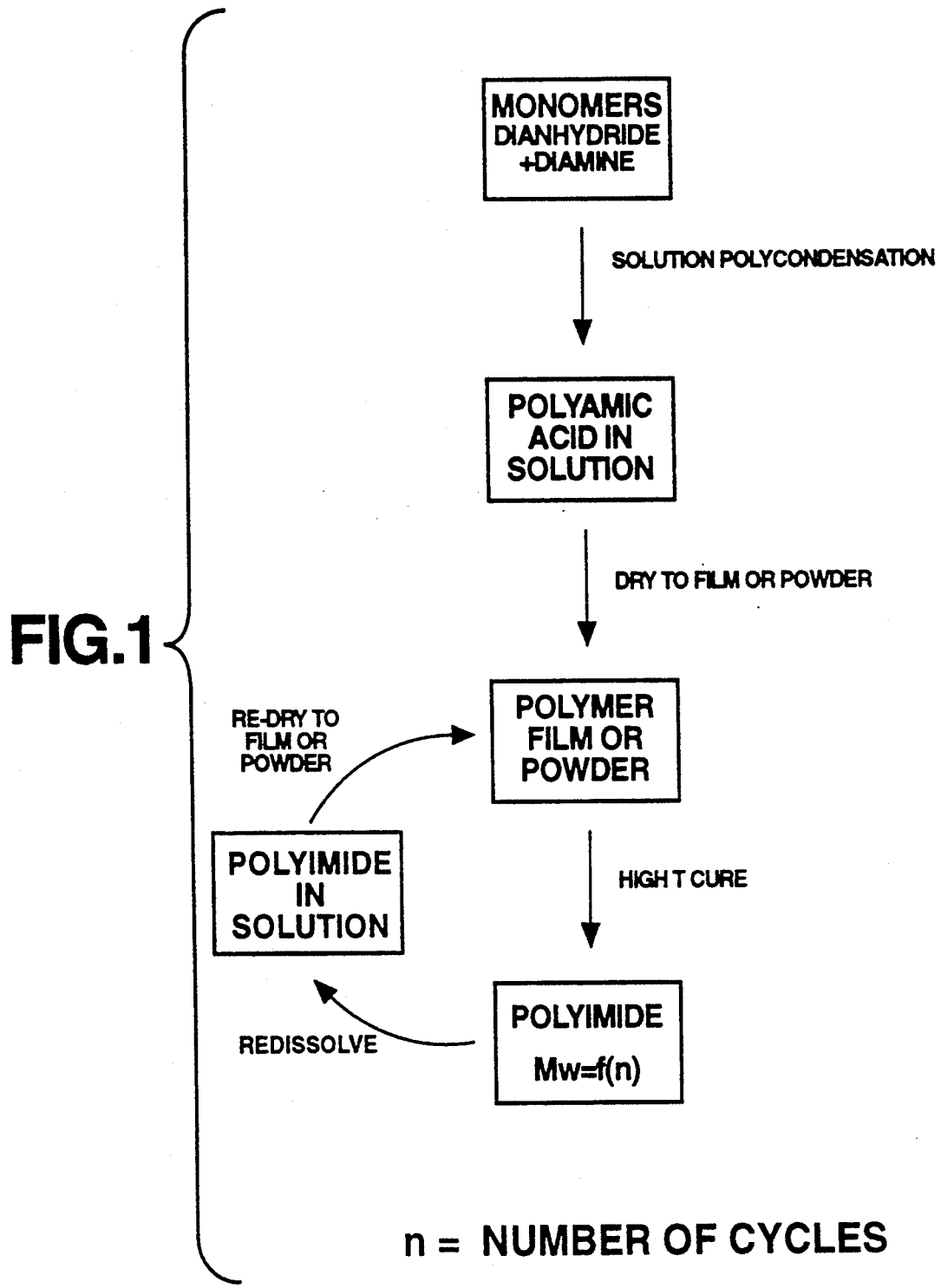
FIG. 1 is a schematic diagram showing a cyclic chain extension reaction according to the present invention as applied to synthesizing polyimides from monomers of low reactivity.

Ordinarily, polyimides are synthesized in a two step process. Equimolar amounts of dianhydride and diamine are mixed together in a suitable solvent and after several hours at room temperature a high molecular weight polyamic acid is formed. From this solution of polyamic acid, a film is cast and dried, and is then heated to a high temperature to initiate ring closure to the imide. The molecular weight is unaffected by this high temperature cure because there are no reactive end groups available for furthering the polymerization as the initial solution condensation typically goes to near completion. (FIG. 1). The situation is quite different however when the reactivity of the amine groups on the diamines is so low that reaction in solution will proceed only to a small extent.

This invention describes a way to polymerize monomers of low reactivity to a high extent of reaction using a multistep process. In the first stage of polycondensation equimolar amounts of diamine and dianhydride are mixed together in a solvent like NMP (n-methyl pyrrolidinone) or DMAC (dimethylacetamide) and allowed to react to whatever extent they will under solution conditions. During this stage of reaction there may be some advantage gained in heating the solution to drive the reaction, but this is dependent on the specific monomers being used.

After this solution reaction has been carried out, the cooled solution is cast onto a substrate and dried under vacuum to obtain films of the oligomeric polyamic acids.

These films are then heated in an inert atmosphere to high enough temperatures to cause enough chain movement for reactive amine and anhydride end groups to find each other and react, thereby increasing the molecular weight. As only a fraction of chain ends are likely to be in exactly the right position relative to a chain end of the opposite type, only that fraction will be able to chain extend. If the polymer is cooled, resolvated, and then recast a new set of chain ends will be correctly oriented relative to complementary chain ends and reheating to high temperatures will again react only those groups with one another. Repeated cycles of this casting, curing, resolvating cycle would build the molecular weight to very high degrees unobtainable by other methods. The reason that all of the available end groups do not react the first time a high temperature is reached in the solid state is simply a matter of relative spatial orientation of the complementary end groups. As the mobility of these chain ends is extremely limited, even above Tg, (the glass transition temperature) only a small volume is accessible by diffusional processes to each end group in which it can "search" for reactive partners. For some fraction of end groups a partner will exist in that volume, and only some fraction of these will have acceptable orientations for reaction to occur. Once these few have reacted little is gained by keeping the polymer at that temperature any longer. It is likely that a plateau is reached in the reaction vs. time, or at least a knee in the reaction curve will be reached whereby the rate of reaction will be reduced beyond a practical rate of reaction, thus requiring the resolution, redrying and recuring as described. Resolution and recasting of the film however may infuse a new set of properly aligned end groups that will be able to react. Again once this set is more or less spent, resolvating, and recasting will generate a new set that is properly aligned for coupling. FIG. 1 is a schematic diagram showing a cyclic chain extension reaction according to the present invention for synthesizing polyimide, for example, as a film or powder, from monomers of low reactivity.

This process is preferably suited to materials that are soluble in the imide form unless an additional step is utilized to resolvate the cured material. Such a step could be ring opening to the amic acid via a KOH, acid treatment, or by employment of more elaborate means such as electrochemical reduction which renders many otherwise insoluble polyimides soluble in aprotic solvents.

Our work has shown that several polyimides that produced only oligomers during solution polycondensation can successfully be made into higher molecular weight materials by utilizing a single solid state chain extension step after the solution stage reaction. This allowed the preparation of mechanically tough polymer films from materials that would otherwise have formed only powders which would be useless for practical purposes.

Figure 2:
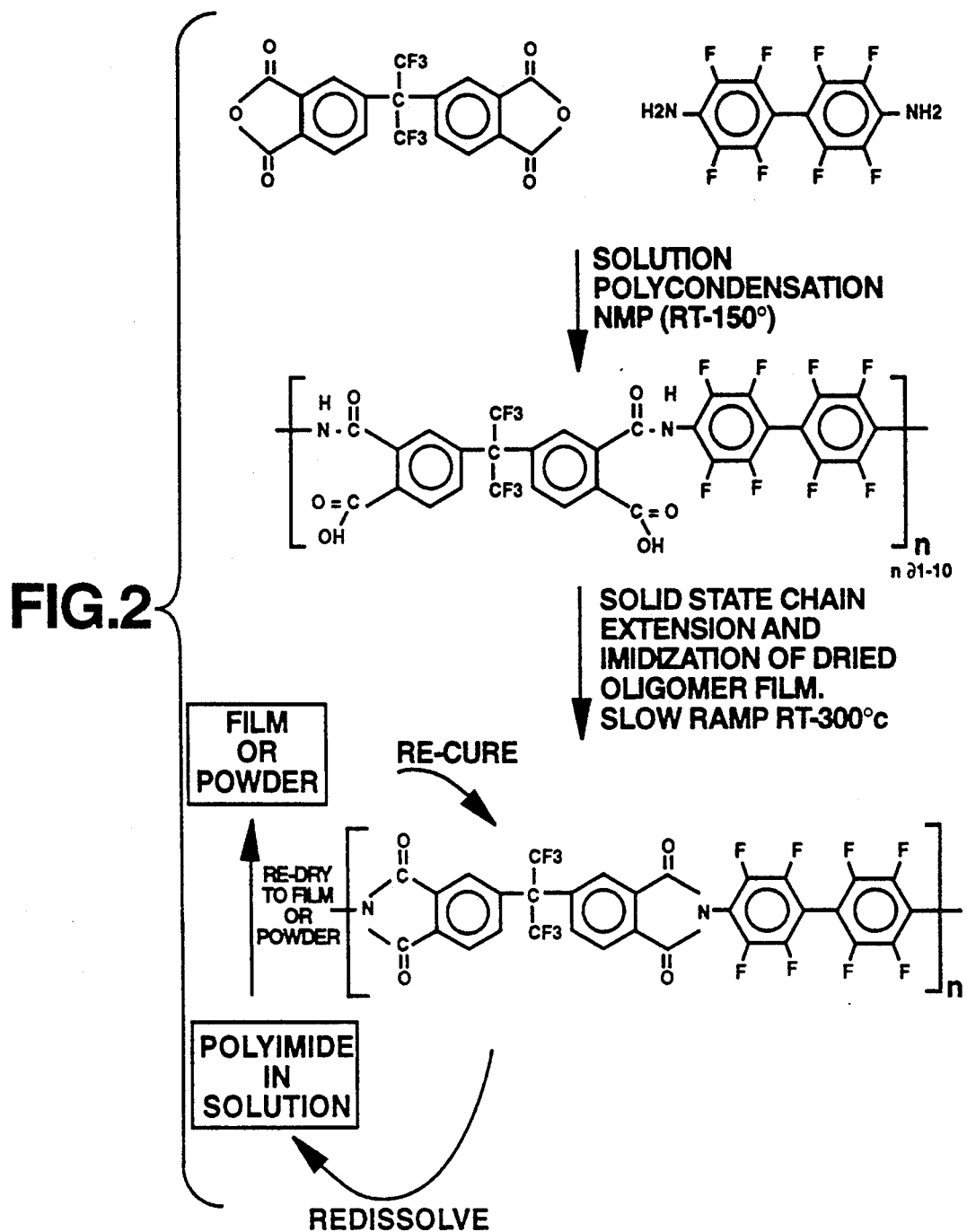
FIG. 2 is a specific example of the process of FIG. 1.
Figure 3:
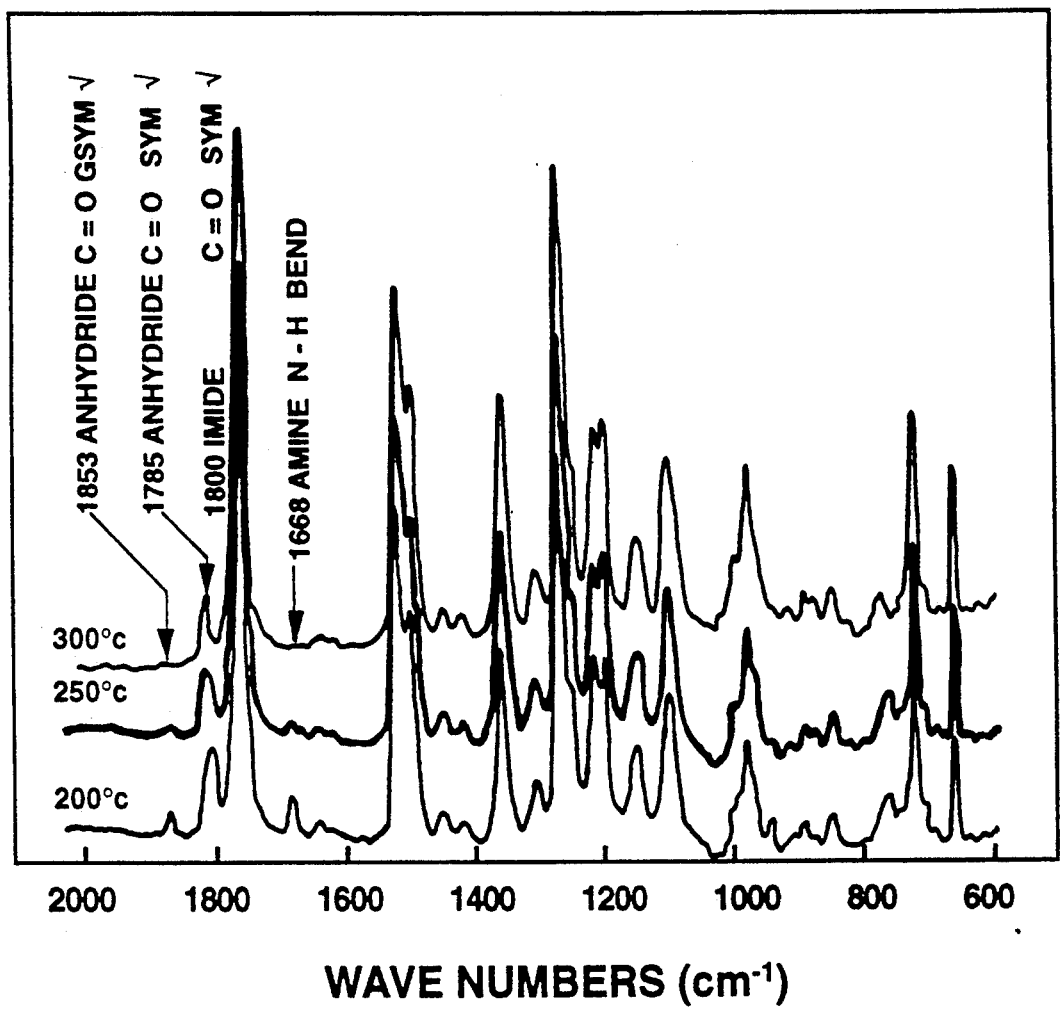
FIG. 3 is an FTIR spectra of 6FDA-OFB after three different temperature cures.

An example of a polyimide that we prepared utilizing this combined solution and single solid state polymerization technique is 6FDA-OFB (hexafluorodianhydride-octafluorobenzidine) which is the final product shown in FIG. 1. This procedure is shown in FIG. 2. As it shows, the 1st step, which is carried out in solution yields only very low molecular weight oligomers because of the intrinsically low reactivity of the fluorinated diamine. When a film is cast from this first stage material, it is extremely fragile and brittle. When it is subsequently heated very slowly to temperatures above 250° C., the amine and anhydride end groups react with each other which results in a doubling of the molecular weight of those reacting chains. This behavior is demonstrated by FIG. 3 which shows the infrared spectra of 6FDA-OFB after the fragile film made by drying the oligomer solution was heated to 200°, 250°, and 300° C. We can see by examining the infrared peaks associated with the carbonyl stretching vibrations of the anhydride end groups, and the N-H bending vibrations of the amine end groups that after heating to 200°, substantial amounts of free end groups are still present, but that by 250° these peaks are substantially attenuated, and by 300° these peaks are absent indicating that the unreacted engroups have been consumed. As the sensitivity of infrared spectroscopy does not allow a determination of extent of reaction beyond 97 percent or so, even the total disappearance of these end group vibrations does not assure us that a significant number of reactive end group pairs does not still exist that could be utilized for substantial amounts of additional growth in the molecular weight, and with it substantial improvement of the mechanical properties of the material.

The degree of polymerization is governed by the equation:

$$\bar{X}_n = \frac{1}{1-p}$$

when p=the extent of reaction and $\bar{X}_n$ is the number average degree of polymerization or the number of monomer units linked together. Increasing p from 97% to 98%, which is indistinguishible by FTIR nearly doubles the $\bar{X}_n$ from 32.3 to 50 and going to p=0.99 increases $\bar{X}_n$ to 100. so it is clear that there is much to gain from additional chain extensions that can be made to occur.

The cyclic chain extension process disclosed herein could be stopped after reaching a temperature at which chain extension had already occurred to a significant degree but at which the polymer film is still soluble. Resolution and recasting and drying would result in the random alignment of a new set of end groups which would react with each other upon heating to the same temperature.

In the case of 6FDA-OFB an appropriate temperature for the high temperature cure may be from about 200° C. to 350° C., preferably 250° C. as it is seen by the infrared analysis to be high enough to accomplish substantial chain extension, while it is probably low enough to allow resolution.

This principle is not limited to polyimides. Any polycondensation reaction which shows improved reactivities in a neat (solventless) environment or at temperatures only achievable in a neat environment may find considerable utility in employing a cyclic process such as this. Examples of other materials that could employ this technique are polyurethanes, polyamides, polyesters, and just about any other polymer normally made by polycondensation polymerization. Starting materials for these polymers can be found in "Principles of Polymerization" by George Odian, John Wiley & Sons, copyright 1970, the teaching of which is incorporated herein by reference.

Figure 4:
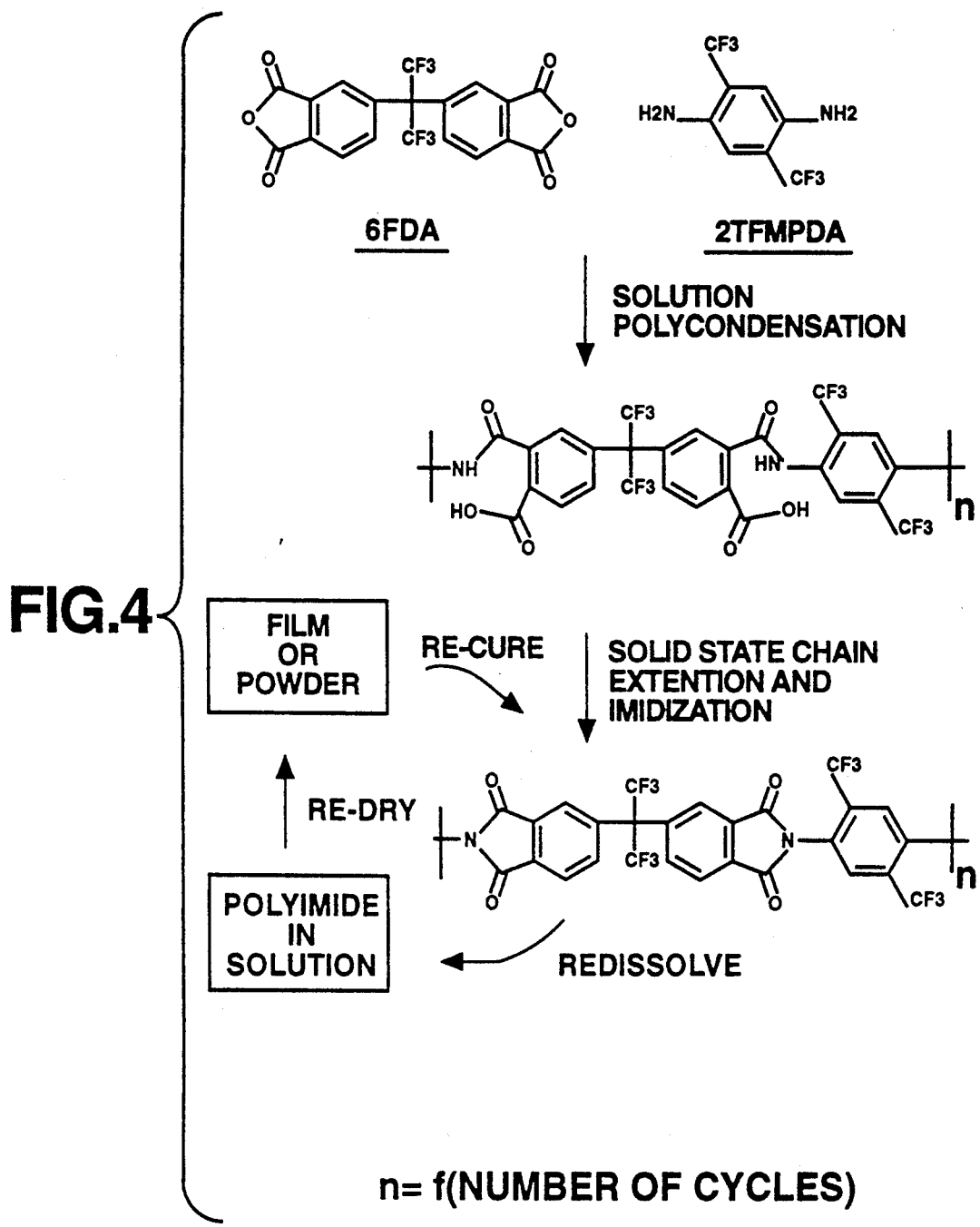
FIG. 4 shows the chemical equations for the fabrication of 6FDA-2TFMPDA by the process of FIG. 1.

This multicyclic approach has been used to fabricate 6FDA-2TFMPDA (hexafluoro isopropylidene bis(phthalic anhydride) 2,5-di(trifluoro methyl) phenylene diamine) as shown in FIG. 4. This material forms only very small (low) molecular weight materials during a solution polycondensation reaction. Amic acid oligomer solution was cast and dried onto a quartz substrate and was dried in a vacuum oven to produce a thin film of the dried amic acid oligomer. In one test, involving several cycles, this film was heated slowly to 300° C. which resulted in both ring closure and chain extension and produced a strong durable film. To test the claim that repeated cycles of a solid state chain extension could gradually build the molecular weight we again utilized the highly deactivated diamine 2TFMPDA along with the dianhydride 6FDA. We cast a solution of the amic acid oligomer onto a quartz substrate and as before dried it in a vacuum oven. The film was then heated slowly under an atmosphere of nitrogen to 250° C., a temperature where we assumed that the chain extension process would be occurring but where unwanted radical crosslinking reactions would be certain not occur. This film was then redissolved into NMP from the quartz and again cast onto the same substrate and dried. The film dried into a crackled surface that resembled a dry lakebed, which is an indication of low molecular weight. After the same process of re-curing, redissolving, and redrying was performed again, the resulting film was more intact. After a third cycle the dried film was continuous and strong; clear indications that the material was now of a molecular weight above that required for good film properties. As these conditions were kept mild to avoid any complications of side reactions, it is highly likely that the temperature and duration of the cure cycle could be increased substantially to allow an even faster and more effective building of the chain molecular weight.

A new polyimide derived from hexafluoro isopropylidene bis phthalic anhydride (6FDA) and a new diamine 2,5 bis trifluormethyl p-phenylene diamine (2TFMPDA) has been synthesized and partially characterized. It is found to have very desirable properties including one of the lowest dielectric constants observed in polyimides, 2.59 while also having one of the highest glass transition temperatures observed among fluorinated polyimides, 365° C. at 1 Hz.

6FDA-2TFMPDA is synthesized by mixing purified 6FDA and 2TFMPDA together in a high boiling solvent such as NMP and allowing them to react under a blanket of inert gas to form the polyamic acid (PAA). The reaction has been shown to work at a variety of temperatures ranging from room temperature to 200° C.

Figure 5:
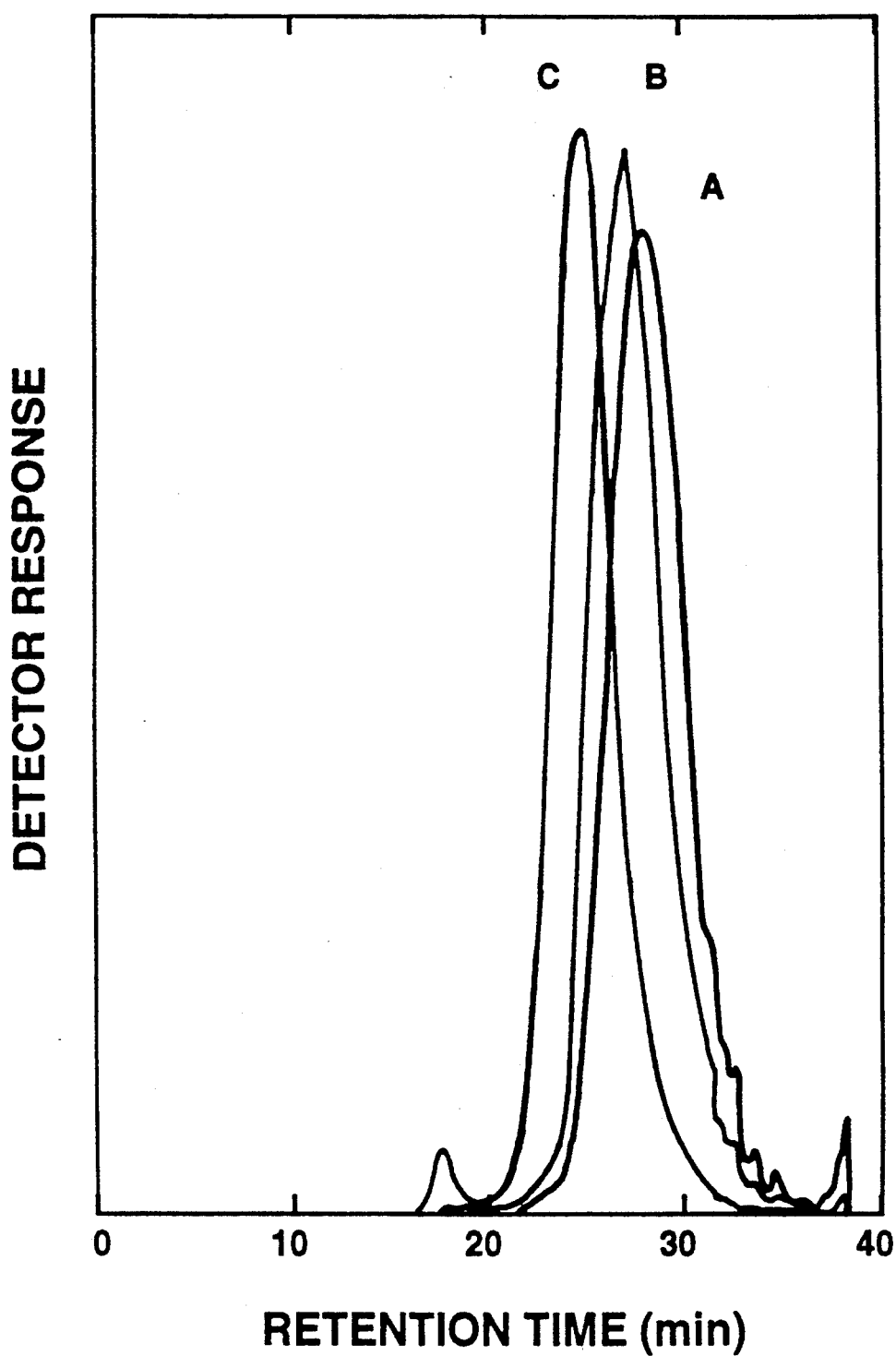
FIG. 5 shows a GPC chromatogram for 6FDA-2TFMPDA fabricated according to the present invention, illustrating the increasing molecular weight with each cycle of cure, redissolve, dry and recure.
Figure 6:
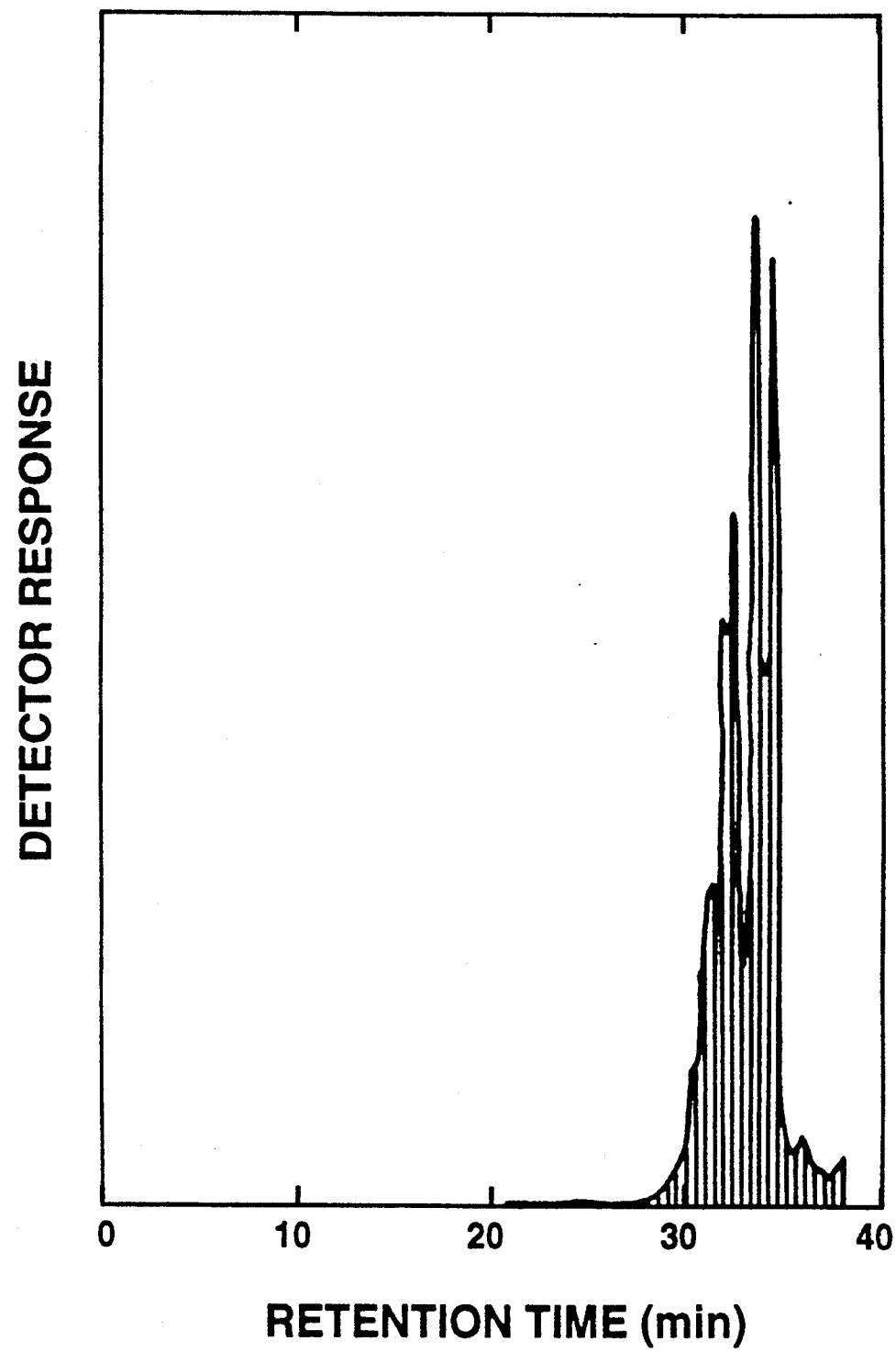
FIG. 6 shows a GPC chromatogram of the material of FIG. 5 after the solution polycondensation.

The molecular weight of the polycondensation product after room temperature reaction was measured via size exclusion chromatography (also called gel permeation chromatography) (GPC) relative to polystyrene standards as shown in FIG. 6. This shows that the approximate molecular weight of the PAA after solution condensation at room temperature is on the low side (Mn=1656) which is probably due to a combination of the electron withdrawing effects of the fluorine and the significant steric bulk of the CF3 group which could hinder the facile approach of one monomer to its reactive partner. This low molecular weight is overcome by careful choice of curing conditions to allow significant degrees of chain extension to occur which can build the MW to a value high enough to provide good mechanical properties to the final film. FIG. 5 shows the GPC chromatogram after a final cure to 300° C. where Mn has increased to 25,353, which is ample for good mechanical properties.

The dielectric constant of this material was investigated by making capacitance measurements at 1 KHz under both ambient conditions and after exhaustive in situ drying under heated vacuum conditions. These values were 2.87 and 2.59 respectively. In addition it was found to have very low refractive indices in both TE and TM modes which were 1.518 and 1.514 respectively.

Examples of fluorinated diamines useful to practice the present invention are:

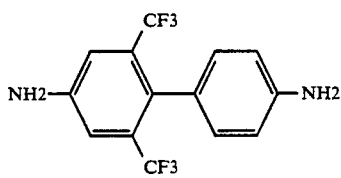

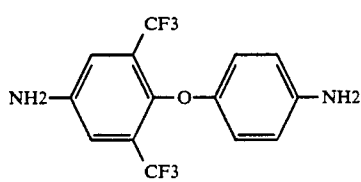

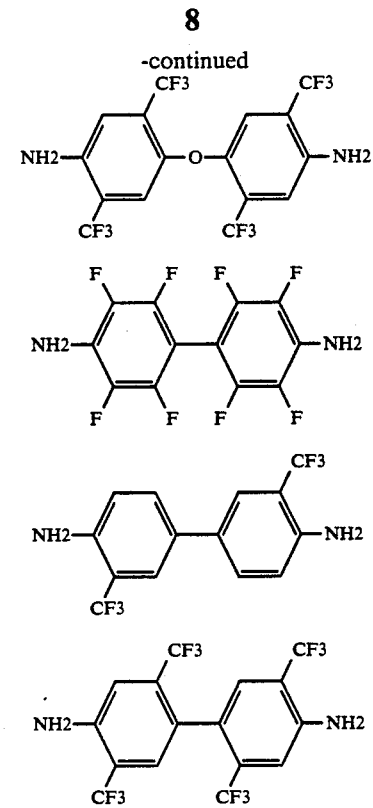

Note that the last member of this group does not have an even number of fluorine containing groups on each phenyl ring. Optimal dielectric properties are generally achieved by diamines having an even number of fluorine containing constituents on one phenyl ring.

The fluorine containing unit can have the following type of group wherein $R^5$ is organic and wherein $R^5$ contains nitrogen if the group is an amine:

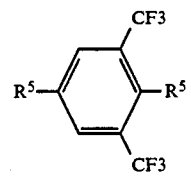

This group has a net dipole moment along the molecules axis of rotation $R^5$-$R^5$ but does not have a a dipole moment with respect to (perpendicular to ) the principle axis of rotation of the molecule which is what is most desirable from a dielectric constant point of view. For this to be achieved it is preferalbe that there be an even number of fluorine containing constituents on each particular aromatic ring which act as individually rotatable units.

When the polymer contains a phenyl ring, the following substituted rings can provide a preferred low dielectric constant:

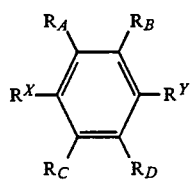

where $R_A$, $R_B$, $R_C$, $R_D$, =H, F, $CF_3$, —$CF_2CF_3$, —$(CF_2)_nCF_3$ and where $R^x$ and $R^y$=$NH_z$, O, $CF_2$, $(CF_2)_n$, S, $SO_2$, hexafluoro isopropylidine, aromatic rings or phthalic anhydride groups.

Preferably the substituted phenyl ring is incorporated to the polymer backbone through bonds to $R^x$ and $R^y$ through bonds directly to the carbon atom to which $R^x$ and $R^y$ are bonded.

Also, such common monomer frameworks such as the following are recognized and the above shown general structure for a single aromatic ring also applied in these cases: Examples of structures, containing a plurality of phenyl rings, which can be incororated into a polyimide backbone are:

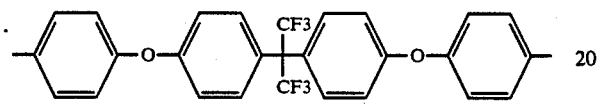

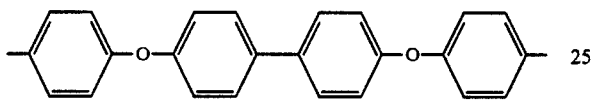

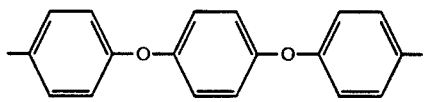

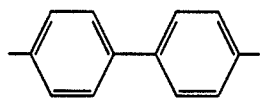

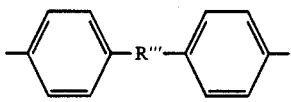

Examples of amines with these phenyl containing constitutents with the fluorine containing constituent not ortho to the amine are:

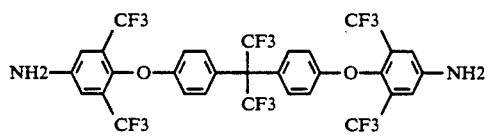

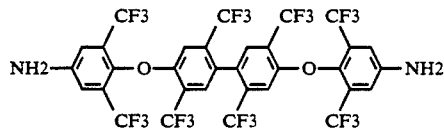

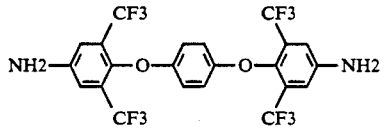

Examples of amines with these phenyl containing constitutents with the fluorine containing constituents ortho to the amine are:

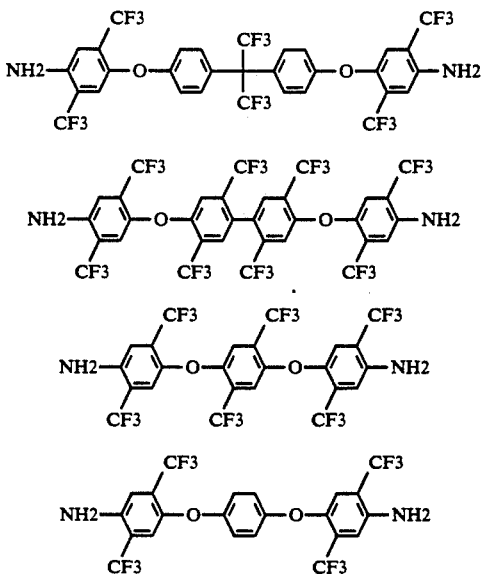

The amine groups of these phenyl containing constituents are substantially less reactive when the fluorine containing constituents are ortho to the amine group and therefore are generally fabricated by cyclic chain extension.

The monomer 2,5-bistrifluoromethyl 1,4-phenylene diamine (2TFMPD or 2TFMPDA), is a previously unreported material. This monomer is fabricated as follows. 2,5 bis trifluoromethyl aniline is converted to the acetanilide by reaction with perfluor acetic anhydride in order to protect the amine. This is then nitrated in nitric acid, isomers separated, and reduced to the amine. The acetanilide is hydrolysed under acidic conditions to protect the CF3 functionality from the more frequently used basic hydrolysis conditions and the final product is purified by recrystallization from ethanol/methanol mixtures.

Polymerization of 2TFMPDA with 6FDA was carried out under a variety of time and temperature conditions from room temperature to 200° C. and a non-viscous pale yellow solution was obtained in all cases. To our surprise it was found that despite severe steric interference of the two ortho (to the amine) CF3 groups to nucleophilic attack and the deactivation of the donor characteristics of the amine (because of the two electron withdrawing CF3 groups), the room temperature solution was better able to produce high quality films than the higher temperature polymerized materials. However, none of these conditions were able to produce films durable enough for handling with the normal curing and single chain extension procedure and so a modified scheme was developed utilizing a cyclic multi-step approach which succeeded in making mechanically durable films.

A modified solid state curing scheme is desirable to obtain continuous and durable films with 6FDA-2TFMPDA. In order to try to coax these materials into film formation we tried redissolving (these materials are soluble as the imide), redrying, and recurring. We hoped that perhaps the materials had been cracking apart before significant chain extension could occur in the first cure and that polyimide solutions made from these materials after this first cure would remain intact during a second curing process. Curing this second cycle material resulted in a cracked lake bed formation as well but was not quite as severe. Upon a third such redissolving and redrying no mass migration or film cracking occurred and the dried film was smooth. Upon recurring, this dried film remained intact and produced a smooth and strong final film suitable for measurements of electrical properties. It seemed apparent that on the first cure the polyamic acid underwent imidization and that some chain extension also occurred. Upon the second curing, additional chain extension occurred but to an insufficient extent to give a strong final product. The third cure apparently resulted in enough chain extension to produce a material with sufficient molecular weight for good mechanical film properties. Some point must be reached in this total cyclic process where the material tensile strength exceeds the stress from shrinkage that occurs during both additional reaction of unreacted end groups and from solvent loss.

The ordinary synthetic procedure for the preparation of a cured polyimide from highly reactive monomers such as PMDA and ODA involves the simple mixing of the two monomers in a solvent under nitrogen, equilibration overnight, casting of the resulting viscous solution, drying and finally curing to a high enough temperature to cause cyclodehydration of the amic acid to the five member imide ring which usually occurs by around 200° C. In contrast, the synthesis of polyimides from many of our fluorine containing diamines proved to be challenging because the basicity of the amines adjacent to fluorine atoms or trifluoromethyl groups was severly attenuated. This was evidenced by the fact that with few exceptions the viscosity of the "polymer" solutions was very low after the two monomers were mixed together and allowed to react together even at high temperatures and for long times. The viscosity usually was indistinguishable from the viscosity of the initial mixture, which to the eye was like that of solvent alone. Two exceptions to this with fluorine containing amines were 6FDA-PFMB (Hexafluoro isopropylidene bis (phthalic anydride)-3,3' di(trifluoromethyl) benzidine) and 6FDA-FPDA (hexafluoro isopropylidene bis (phthalic anhydride) 2-fluoro phenylene diamine) which both produced solutions with viscosities that were substantially greater than the initial solution. With PFMB this was presumably due to the fact that the CF3 groups are distant from the amine groups (meta position instead of ortho) thus exerting no steric influence in their reactivity and a smaller electronic effect than if they were ortho to the amine. With 6FDA-FPDA the influence of a single fluorine atom is relatively small both sterically and electronically and so even though fluorine was ortho to the amine it apparently had only minimal effect on the reactivity.

We were able to get around these reactivity problems by relying on further reaction between the amines and anhydrides in the solid state during the high temperature curing step to acquire materials of adequate molecular weight for formation of durable films.

The chain extension of these polymers initially was merely a practical means for obtaining a series of fluorine containing polyimides that we had chosen for the investigation of structure/property relationships. The chain extension process was first observed and utilized after running 6FDA-TFPDA (hexafluoro isopropylidene bis (phthalic anhydride) tetrafluoro phenylene diamine) and 6FDA-OFB (hexafluoro isopyroylidene bis (phthalic anhydride) octafluoro benzidine) in solution under a variety of conditions. In all cases low viscosity solutions were obtained that usually dried into cracked and unmanageably fragile films. As this was a clear indication that little or no polymerization had occurred we were becoming convinced that the "normal" approach to the synthesis of polyimides with highly fluorinated amines wouldn't work. We decided to look at the thermal stability of the 6FDA-TFPDA materials despite their mechanical inadequacies and after doing a TGA run it was found that a large bubble had formed at some stage in the heating which was smooth and mechanically durable. We then thought that if we tried the high temperature curing under more controlled conditions we could perhaps mimic a melt polymerization but instead of starting from monomer as in most melt polymerizations we could start with a film of dried oligomer. Other workers have previously observed that melt polymerization can sometimes result in higher molecular weight than the more standard solution polymerization: J. P. Critchley, V. C. R. McLoughlin, J. Thrower, and I. M. White, in: Br.Polym. J. vol. 2, (1970) 288-293; and J. P. Critchley, P. A. Grattan, M. A. White and J. S. Pippett, in: J. Polym. Sci. A-1 vol. 10, (1972) 1809-1825.

After much trial and error we found that extremely slow cures which reached temperatures in excess of 350° could produce strong films which were smooth and crack free. The finding of workable conditions for the second stage polymerization in the solid state and its refinement was initially a practical concern intended only to allow the preparation of our desired range of materials; however, it also generated scientific interest in the process itself which involves many different physical and chemical phenomena.

The main issues involved in determining the extent and nature of the chain extension are end group reactivity, chain mobility, and end group mobility; which in turn involve viscoelastic transition behavior and the role of entrapped solvent in plasticizing chain and endgroup mobility.

According to the method of the present invention, 6FDA-2TFMPDA was successfully prepared. Despite the original oligomer solutions drying into nice uniform films the films came out after the solid state cure badly cracked, flaking, and brittle. It appeared that if chain extension were occurring in this material during the solid state cure and one such pass was insufficient to obtain materials with high enough MW for durability that perhaps the chain extension process was self limiting. It appears that the chains have insufficient mobility to allow the chain ends to diffuse over a large enough volume to find and react with other chain end groups in sufficient proportion to raise the average MW above its critical value for mechanical durability. If indeed it was a chain end diffusion limited condition, then the polymer film fragments could be made to redissolve and if recast then a new set of chain ends would be placed within a reasonable diffusion volume to allow further chain extension to occur.

On this premise we cured a new sample to only 250° to insure that it would redissolve and then after this first curing dissolved the fragments of the 6FDA-2TFMPDA again in NMP, redryed it, and recured it to 250° C. We found that although it was still cracked and flaking the film quality had improved somewhat. We repeated this cycle a third time and a beautiful film, unbroken, and durable resulted. This lead us to strongly believe that the chain extension was indeed occurring and was a critical molecular process in the synthesis of materials of this type.

To further explore this process we took 6FDA-2TFMPDA cured it to 250° C., redissolved, redryed and recured it to 250°, and finally redissolved, redryed, and recured it to 300°. Samples taken after each stage of these 3 cycles were then measured to determine their molecular weights. The results are shown in the Table. It can be clearly seen that the molecular weight after each step increases dramatically. This provided us with direct and definitive proof that chain extension was occurring and was responsible for the gradual improvement in the polymer properties.

TABLE

| Molecular weight of 6FDA-2TFMPDA after successive curing | |
|---|---|
| $T_{max}$ of cure | Number ave MW. |
| dryed at 100° (polyamic acid precursor) | 1216 |
| 250° | 7537 |
| 250° | 9457 |
| 300° | 25,353 |

In general, whenever fluorine atoms or trifluorimethyl groups are ortho to the amine group the reactivity of the amine is powerfully reduced, making high molecular weight polymerization difficult if not impossible without the use of this cyclic process.

The cyclic process of the present invention may also be used in bulk processes as well. For instance, if polymer were precipitated from solution and heated in solid form to affect chain extension. In this process a point may be reached where solid state polymerization would self extinguish limiting the molecular weight achievable. If the polymer at this point were redissolved and reprecipitated and then recured; higher molecular weight would be achievable. This bulk cyclic process is more suitable for large scale polymerization processes and may have more general commercial applications than the thin film type process used in our experiments. The same principles apply.

In addition, if the polymer is not soluble as the imide, the polymer functionality must then be reversibly redox active, that is, capable of accepting and donating electrons rapidly and without competing, irreversible chemical changes. This allows the redissolving of the polymer. This reversibility may require such precautions as exclusion of oxygen or potential proton donors. The polymer is also preferably able to take up sufficient solvent by swelling or absorption to permit diffusion of electrolyte ions into the polymer.

The polyimides that can be treated in accordance with the present invention include unmodified polyimides, as well as modified polyimides such as polyester imides, polyamid-imide-esters, polyamide-imides, polysiloxane-imides, as well as other mixed polyimides or polyimide blend materials. Such are well-known in the prior art and need not be described in an great detail.

Generally, the polyimides include polymers having diimide and monoimide recurring units.

Generally, the polyimides having diimide units have the following recurring units:

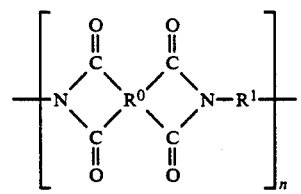

where n is an integer representing the number of repeating units to provide a molecular weight usually about 10,000 to about 100,000. $R^0$ is at least one tetravalent organic radical selected from the group consisting of:

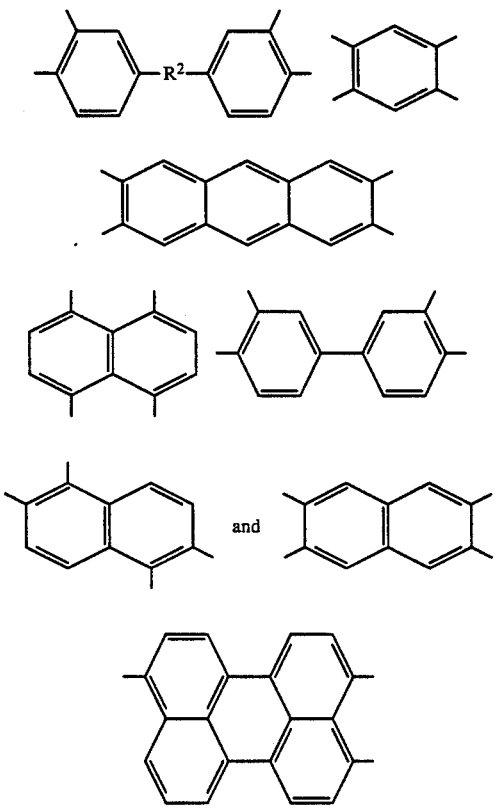

$R^2$ being selected from the group consisting of divalent aromatic and/or aliphatic hydrocarbon radicals having from 1 to 4 carbon atoms or aromatic rings and carbonyl, oxy, sulfo, sulfide, ether, siloxane, phosphine oxide, hexafluoroisopropylidene and sulfonyl radicals and in which $R^1$ is at least one divalent radical selected from the group consisting of an aliphatic organic radical or from the group shown:

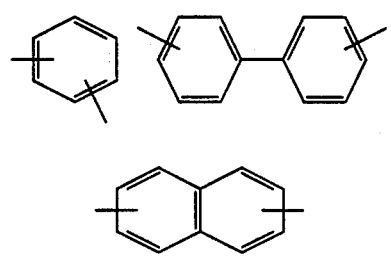

-continued

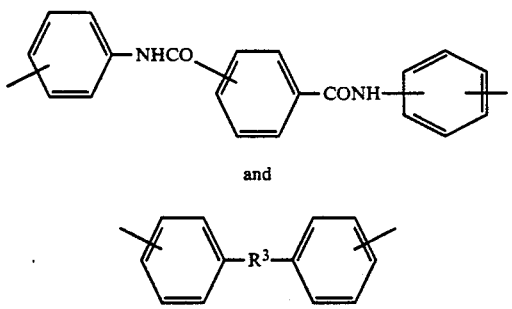

and in which $R^3$ is a divalent organic radical selected from the group consisting of $R^2$, silico, and amino radicals. Polymers containing two or more of the $R^0$ and/or $R^1$ radicals, especially multiple series of $R^1$ containing amido radicals, can be used.

Generally, the polyimides having monoimide units have the following recurring units:

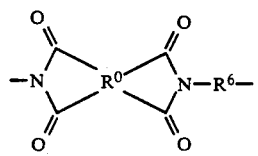

wherein $R^6$ comprises: substituted

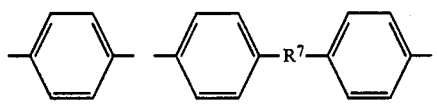

where $R^7$ can be aromatic or alphatic hydrocarbons or hetro atom groups like oxygen, sulfer, hexafluoroisopropylidene, carbonyl, etc.

The molecular weight is usually about 10,000 to 100,000. Examples of monoimide polyimides are given in "The Encyclopedia of Chemical Technology Third Edition" article incorporated by reference supra.

Polyimides are available commercially from a variety of suppliers in one of three forms: a) as solutions of the polyamic acid precursors (e.g., DuPont Pyralin); b) as pre-imidized polyimide film (e.g., DuPont Kapton® film); or c) as pre-imidized powders (e.g., Ciba-Geigy Matrimid 5218) or solutions (e.g., Ciba-Geigy Probimide). The chemistry of commercial polyimides includes examples of many of the components listed above.

Figure 7:
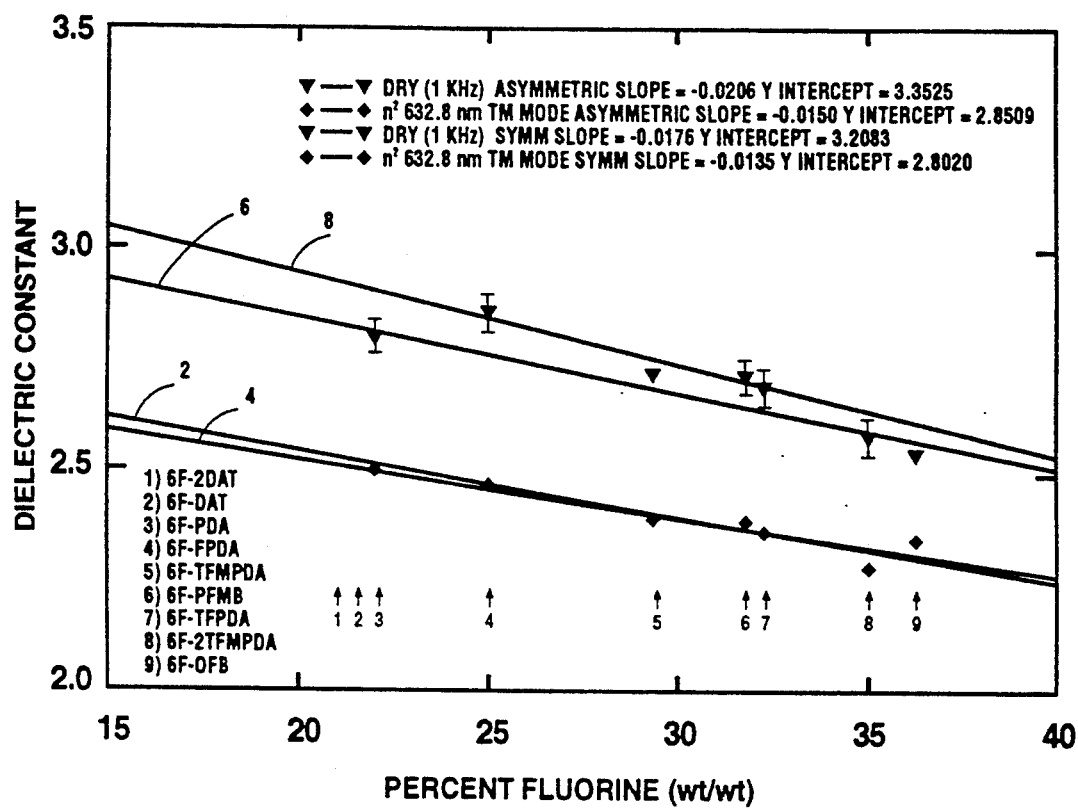
FIG. 7 shows a plot of the low and high frequency dielectric constant as a function of weight percent fluorine for a number of fluorinated polyimide molecules.

Table 2 lists examples of fluorinated low dielectric constant polyimides according to the present invention. Table 3 lists the same polyimides with their corresponding diamines and the dielectric constant ($E^1$) under dry conditions and 40% relative humidity (rh). FIG. 7 plots the dielectric constant of some of these polyimides as a function of the weight percent of fluorine in the molecule. FIG. 7 clearly shows that symetrically disposed fluorine containing constitutents result in a lower dielectric constant. Curves 2 and 4 are plots of the high frequency dielectric constant for molecules having symetrical and asymetric distribution, respectively of the fluorine containing constituent. Curves 6 and 8 are plots of the low frequency dielectric constant for the symmetrical and asymmetrical distribution, respectively, of the fluorine containing constituents. The symmetrical case has a distinctly lower dielectric constant. A significant difference at high frequencies is expected since the fluorine containing constituents are not expected to polarize at high frequencies.

TABLE 2

| Polymer | Structure |
|---|---|
| 6FDA-PDA | |
| 6FDA-FPDA | |
| 6FDA-2FPDA | |
| 6FDA-TFPDA | |

TABLE 2-continued

| Polymer | Structure |
|---|---|
| 6FDA-TFMPDA | (structure) |
| 6FDA-DAT | (structure) |
| 6FDA-2TFMPDA | (structure) |
| 6FDA-2DAT | (structure) |
| 6FDA-OFB | (structure) |
| 6FDA-PFMB | (structure) |

TABLE 3

| Polymer | Diamine | E' (dry) | E' 40% rh |
|---|---|---|---|
| 6FDA-PDA | H2N—⟨ ⟩—NH2 | 2.81 | 3.22 |
| 6FDA-FPDA | H2N—⟨F⟩—NH2 | 2.85 | 3.19 |

TABLE 3-continued

| Polymer | Diamine | E' (dry) | E' 40% rh |
|---|---|---|---|
| 6FDA-2FPDA | 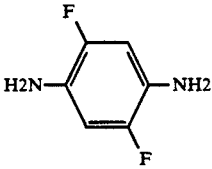 | — | — |
| 6FDA-TFPDA | 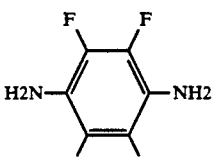 | 2.68 | 2.91 |
| 6FDA-TFMPDA | 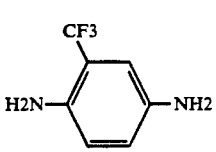 | 2.72 | 3.05 |
| 6FDA-DAT | 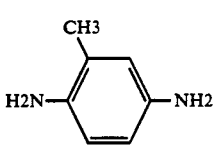 | 2.75 | 3.16 |
| 6FDA-2TFMPDA | 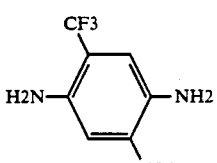 | 2.59 | 2.87 |
| 6FDA-2DAT | 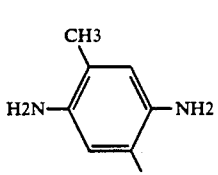 | 2.74 | 3.21 |
| 6FDA-OFB | 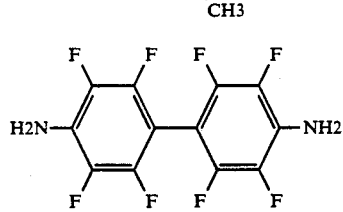 | 2.55 | 2.73 |
| 6FDA-PFMB | 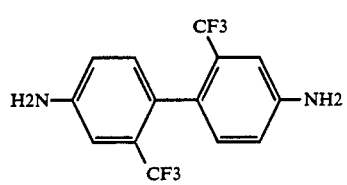 | 2.71 | 2.89 |

While the present invention has been shown and described with respect to specific embodiments, it will be understood that it is not thus limited. Numerous modifications, changes and improvements will occur which fall within the scope and spirit of the invention.

We claim:

1. A low dielectric contact material comprising a plurality of molecules having structural formula:

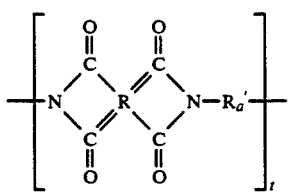

wherein $t \geq 15$, wherein $R^1$ is an organic radical containing fluorine containing constituents sterically arranged so that the dipole moments of said constituents tends to cancel;

wherein a is $\geq 0$; and wherein R is a tetravalent organic radical.

2. The material of claim 1, wherein R contains fluorine.

3. The material of claim 1, wherein said tetravalent organic radical is at least one selected from the group consisting of:

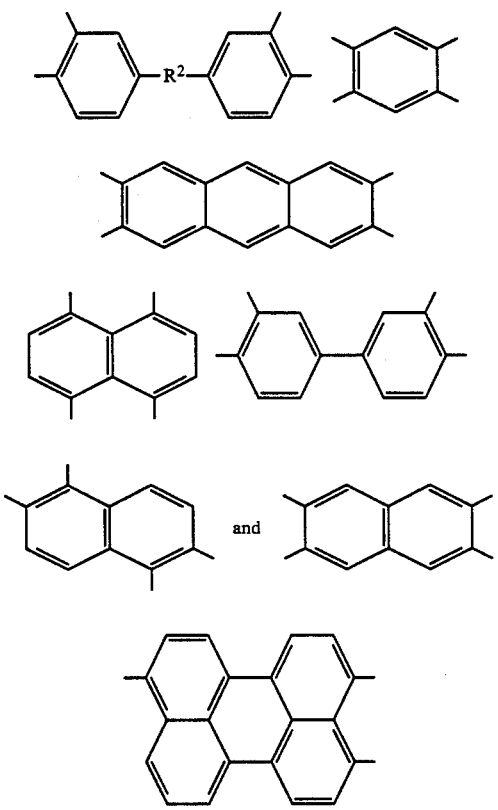

wherein $R^2$ is selected from the group consisting of divalent aliphatic hydrocarbon radicals having from 1 to 4 carbon atoms or aromatic rings and carbonyl, oxy, sulfo, sulfide, ether, siloxane, phosphine oxide, hexafluoroisopropylidene, sulfonyl radicals; and

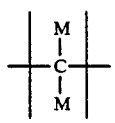

wherein $K \geq 1$;

wherein M is selected from the group consisting of F and fluoroalkyl.

4. The material of claim 1, wherein there are an even number of fluorine containing constituents.

5. The material of claim 3, wherein said tetravalent organic radical includes fluorine containing constituents which are sterically disposed so that the dipole moments of said constituents tend to cancel each other out.

6. The material of claim 5, wherein there are an even number of fluorine containing constituents.

7. The material of claim 4, wherein said fluorine containing constituent is selected from the group consisting of F and fluoroalkyl.

8. The material of claim 1, wherein $R^1$ is aromatic and contains fluorine containing constituents sterically disposed so that the dipole moments of said constituents tend to cancel each other out.

9. The material of claim 1, wherein said fluorine containing constituent is selected from the group consisting of F and fluoralkyl.

10. The material of claim 1, wherein $R^1$ is selected from the group consisting of:

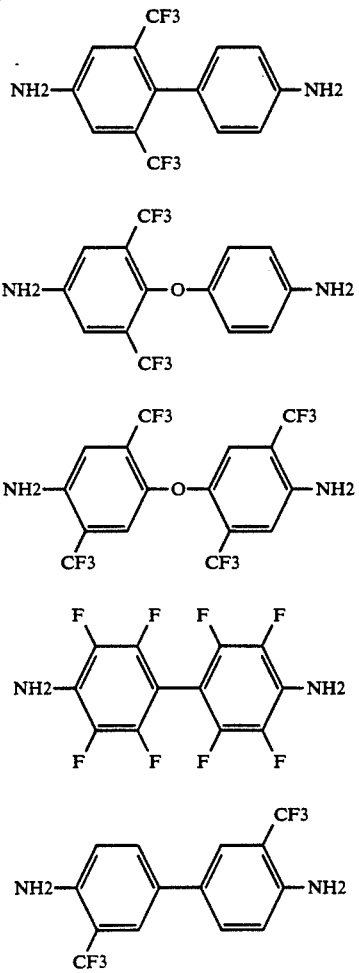

and

-continued

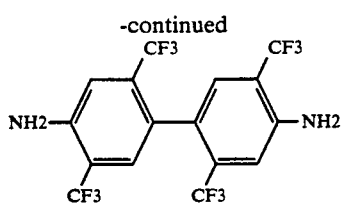

11. A material, wherein n>1, comprising:

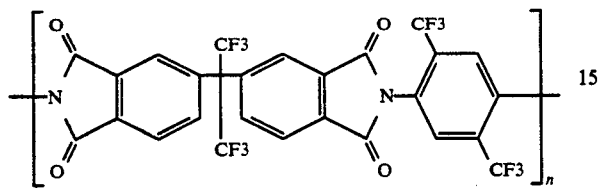

12. The material of claim 1, wherein said molecule has molecular weight greater than about 10,000.

13. The material of claim 8, wherein said molecule has a rotation axis with respect to which the dipole moment of said fluorine containing constituents cancel out.

14. A method of forming a polyimide of high molecular weight comprising the steps of:
   providing an admixture of a dianhydride and a diamine in a solvent;
   permitting said admixture to react to form polyamic acid;
   drying said admixture to remove said solvent;
   curing said polyamic acid to form a polyimide;
   dissolving said polyimide in a solution;
   redrying said solution;
   recuring said redryed solution;
   repeating said steps of dissolving, redrying and recuring a sufficient number of times to increase the number average molecular weight of said polyimide.

15. The method of claim 14, wherein said diamine and said dianhydride have low chemical reactivity.

16. The method of claim 15, wherein said dianhydride contains a plurality of fluorine containing constituents which are sterically disposed so that the dipole moments of said constituents tend to cancel each other out.

17. The method of claim 15, wherein said fluorine containing constituents are selected from the group consisting of F and fluoroalkyl.

18. The method of claim 15, wherein said diamine contains a plurality of fluorine containing constituents sterically disposed so that the dipole moments of said fluorine containing constituents tend to cancel each other out.

19. The method of claim 14, wherein the dipole moments of said fluorine containing constituents tend to cancel each other out with respect to the principle axis of rotation of said polyimide.

20. The method of claim 18, wherein said fluorine containing constituent is selected from the group consisting of F and fluoro alkyl.

21. The method of claim 14, wherein said diamine is aromatic and contains an even number of fluorine containing constituents sterically disposed so that the dipole moments of said fluorine containing constituents tend to cancel each other out.

22. The method of claim 14, wherein said diamine is selected from the group consisting of:

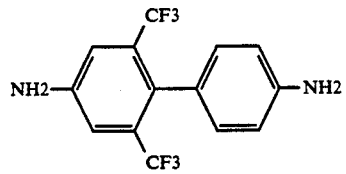

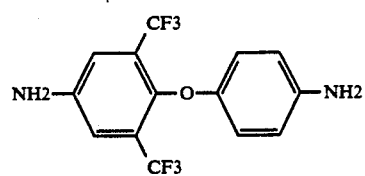

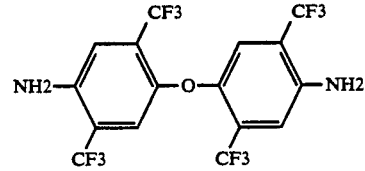

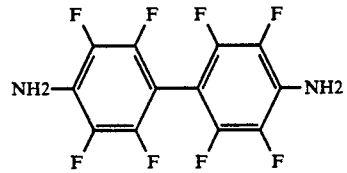

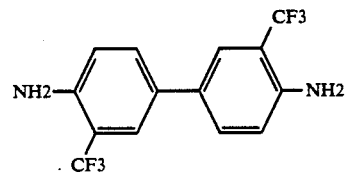

and

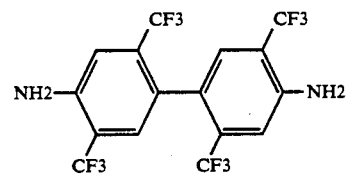

23. A method of forming a polymer comprising the steps of:
   providing an admixture of a first monomer and a second monomer in a solvent;
   heating said admixture to form a polymer precursor;
   drying said admixture to remove said solvent;
   curing said polymer precursor to form a polymer having a number average molecular weight;
   dissolving said polymer in a solution;
   redrying said solution;
   recuring said redryed solution;
   repeating said steps of dissolving, redrying and recuring a sufficient number of times to increase said number average molecular weight of said polymer.

24. The method of claim 23, wherein said first monomer contains a plurality of fluorine containing constituents which are sterically disposed so that the dipole moments of said constituents tend to cancel each other out.

25. The method of claim 24, wherein said fluorine containing constituents are selected from the group consisting of F and fluoro alkyl.

26. The method of claim 23, wherein said second monomer contains a plurality of fluorine containing constituents sterically disposed so that the dipole moments of said fluorine containing constituents tend to cancel each other out.

27. The method of claim 26, wherein said fluorine containing constituent is selected from the group consisting of F and fluoro alkyl.

28. The method of claim 23, wherein said number average molecular weight is greater than about 10,000.

29. The method of claim 23, wherein said first monomer is a dianhydride, wherein said second monomer is a diamine and wherein said polymer is a polyimide.

30. The method of claim 23, wherein said first monomer di-alcohol, said second monomer is a di-isodyanate and wherein said polymer of high molecular weight is a polurethane.

31. The method of claim 23, wherein said first monomer is a diamine said second monomer is a dicarboxylic acid and wherein polymer of high molecular weight is a polyamide.

32. The method of claim 23, wherein said first monomer is a di-alcohol said second monomer is a dicarboxylic acid and wherein said polymer of high molecular weight is a polyester.

33. The method of claim 26, wherein said fluorine containing constituents tend to cancel each other out with respect to the principle axis of rotation of said polymer.

34. The method of claim 26, wherein said first monomer is a dialcohol;
said second monomer is a diaryl fluoride and wherein said polymer of high molecular weight is a polyarylether.

35. The structure of claim 1, wherein said compounds contains at least one phenyl group having a plurality of fluorine containing constituents which are non-ortho to each other.

* * * * *